United States Patent
Zuo et al.

(10) Patent No.: US 7,660,560 B2
(45) Date of Patent: Feb. 9, 2010

(54) BATTERY COVER LATCHING ASSEMBLY FOR PORTABLE ELECTRONIC DEVICE

(75) Inventors: Zhou-Quan Zuo, Shenzhen (CN); Chia-Hua Chen, Tu-cheng (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 668 days.

(21) Appl. No.: 11/377,790

(22) Filed: Mar. 16, 2006

(65) Prior Publication Data

US 2006/0281501 A1    Dec. 14, 2006

(30) Foreign Application Priority Data

Jun. 3, 2005    (CN)    ......... 2005 1 0035127

(51) Int. Cl.
H04B 1/38    (2006.01)
(52) U.S. Cl. ............ 455/90.3; 455/550; 455/566; 455/575; 455/575.8; 455/575.1; 361/790; 361/797; 361/800; 361/775; 361/752; 361/755; 361/600
(58) Field of Classification Search .......... 455/575.1, 455/575.8, 550, 575, 90.3, 566; 429/97, 429/100; 361/790, 797, 800, 775, 752, 755, 361/600
See application file for complete search history.

(56) References Cited

U.S. PATENT DOCUMENTS 6,008,239 A * 12/1999 Kaneko et al. ............ 514/383
6,625,425 B1 * 9/2003 Hughes et al. ............ 455/90.3
6,660,427 B1 * 12/2003 Hukill et al. ................ 429/97
6,975,842 B2 * 12/2005 Chen ........................ 455/90.3
7,002,073 B2 * 2/2006 Lai et al. ..................... 174/50
7,333,777 B2 * 2/2008 Qin et al. .................. 455/90.3
7,414,855 B1 * 8/2008 Arnold ...................... 361/752
7,441,813 B2 * 10/2008 Qin et al. ................... 292/163
7,539,521 B2 * 5/2009 Nam ...................... 455/575.1
2003/0022633 A1 * 1/2003 Chen .......................... 455/90
2003/0116976 A1 * 6/2003 Shreeve et al. ............. 292/116
2004/0228072 A1 * 11/2004 Chen et al. ................. 361/600
2005/0037717 A1 * 2/2005 Oin et al. .................. 455/90.3
2005/0181745 A1 * 8/2005 Wood et al. ............... 455/90.3
2006/0281501 A1 * 12/2006 Zuo et al. ................ 455/575.1
2009/0239596 A1 * 9/2009 Yang et al. .............. 455/575.8

FOREIGN PATENT DOCUMENTS

CN    1422052    6/2003

* cited by examiner

Primary Examiner—Charles N Appiah
Assistant Examiner—Kwasi Karikari
(74) Attorney, Agent, or Firm—Steven M. Reiss

(57) ABSTRACT

A battery cover latching assembly (50) for a portable electronic device (100) includes a housing (20), a first cover (10) configured for attaching to a first side of the housing, and a second cover (30) configured for attaching to a second side of the housing. The battery cover latching assembly includes a locking portion (131), a latch (342), and a button (40). The locking portion is formed on the first cover. The latch is formed on the second cover, the latch is engageable with the locking portion so as to lock the first cover and second cover with each other. The button is configured so as to be retained by the housing, the button is operable to deform the latch so as to unlock the first cover and the second cover.

13 Claims, 6 Drawing Sheets

BATTERY COVER LATCHING ASSEMBLY FOR PORTABLE ELECTRONIC DEVICE

BACKGROUND OF THE INVENTION

1. Field of the Invention

The present invention generally relates to cover latching assemblies and, more particularly, to a battery cover latching assembly for use in a portable electronic device.

2. Discussion of the Related Art

Batteries are widely used in portable electronic devices, such as personal digital assistants (PDAs), mobile phones, and so on. Conventional batteries are attachably received in the electronic device, and battery covers are designed to connect with housings of the electronic devices to package the batteries. The batteries have to be replaced by opening the battery covers when, for example, the batteries are damaged or dead (i.e. no longer rechargeable).

A clasp structure or latch structure is used with a conventional battery cover to engage with a housing of a portable electronic device. For example, the Alcatel OT310 mobile phone has a latch for the battery cover. The latch includes a pair of hooks at one end of the battery cover and a locking pin protruding from the other end of the battery cover. Accordingly, a pair of grooves is defined in an end portion of a backside of a housing of the mobile phone, and a locking hole is defined in the other end portion of the backside of the housing. In assembly, the hooks are firstly inserted into the grooves in the backside of the housing. Then, the battery cover is pressed downwardly to the housing until the locking pin on the battery cover is inserted into the locking hole in the backside of the housing. The battery cover is thus assembled to the housing of the mobile phone. The battery cover is simple in structure, and the engagement between the battery cover and the housing of the mobile phone is firm, too. However, during disassembly, a relative great effort is needed to disassemble the battery cover, since a substantial force is exerted thereon. Therefore, the battery cover can easily be damaged during such disassembly. As a result, it is difficult for a user to replace a battery in the housing of the mobile phone.

Therefore, a new battery cover latching assembly is desired in order to overcome the above-described shortcomings.

SUMMARY OF THE INVENTION

In one embodiment thereof, a battery cover latching assembly for a portable electronic device includes a housing, a first cover configured for attaching to a first side of the housing, and a second cover configured for attaching to a second side of the housing. The battery cover latching assembly includes a locking portion, a latch, and a button. The locking portion is formed on the first cover. The latch is formed on the second cover, the latch is engageable with the locking portion so as to lock the first cover and second cover with each other. The button is configured so as to be retained by the housing, the button is used to deform the latch so as to unlock the first cover and the second cover.

Other novel features will become more apparent from the following detailed description, when taken in conjunction with the accompanying drawings.

BRIEF DESCRIPTION OF THE DRAWINGS

Many aspects of the battery cover latching assembly can be better understood with reference to the following drawings. The components in the drawings are not necessarily to scale, the emphasis instead being placed upon clearly illustrating the principles of the present battery cover latching assembly. Moreover, in the drawings, like reference numerals designate corresponding parts throughout the several views.

DETAILED DESCRIPTION OF THE EMBODIMENTS

The present invention is suitable for portable electronic devices, such as mobile phones, PDAs, and so on.

Figure 1:
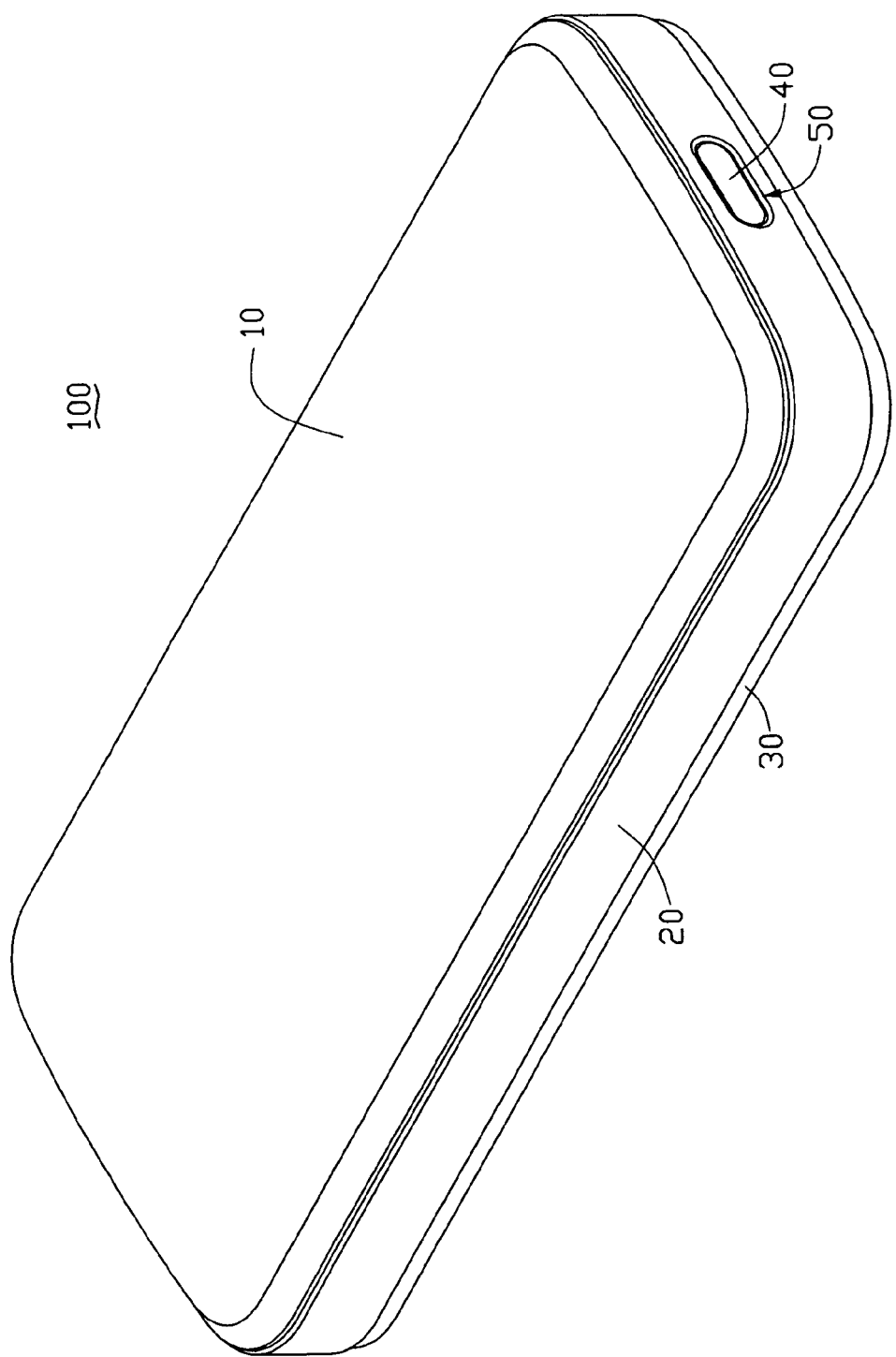
FIG. 1 is an assembled, isometric view of a mobile phone incorporating a battery cover latching assembly, in accordance with a preferred embodiment.

Referring now to the drawings in detail, FIG. 1 shows a battery cover latching assembly 50 incorporated in a mobile phone/portable electronic device 100. The mobile phone 100 is taken here as an exemplary application, for the purposes of describing details of the battery cover latching assembly 50 of the preferred embodiment. The mobile phone 100 includes a battery cover 10, a housing 20 and a front cover 30, all of which are connected via the battery cover latching assembly 50. Also referring to FIG. 2 and FIG. 3, the battery cover latching assembly 50 includes a locking portion 131, a button hole 221, a through hole 242, a latch 342, and a button 40. The locking portion 131 is defined in the battery cover 10. The button hole 221 and the through hole 242 are defined in the housing 20. The latch 342 is formed on the front cover 30. The battery cover latching assembly 50 is mounted in the housing 20 and releasably locks the battery cover 10, thereby interconnecting the housing 20 and the battery cover 10.

Figure 2:
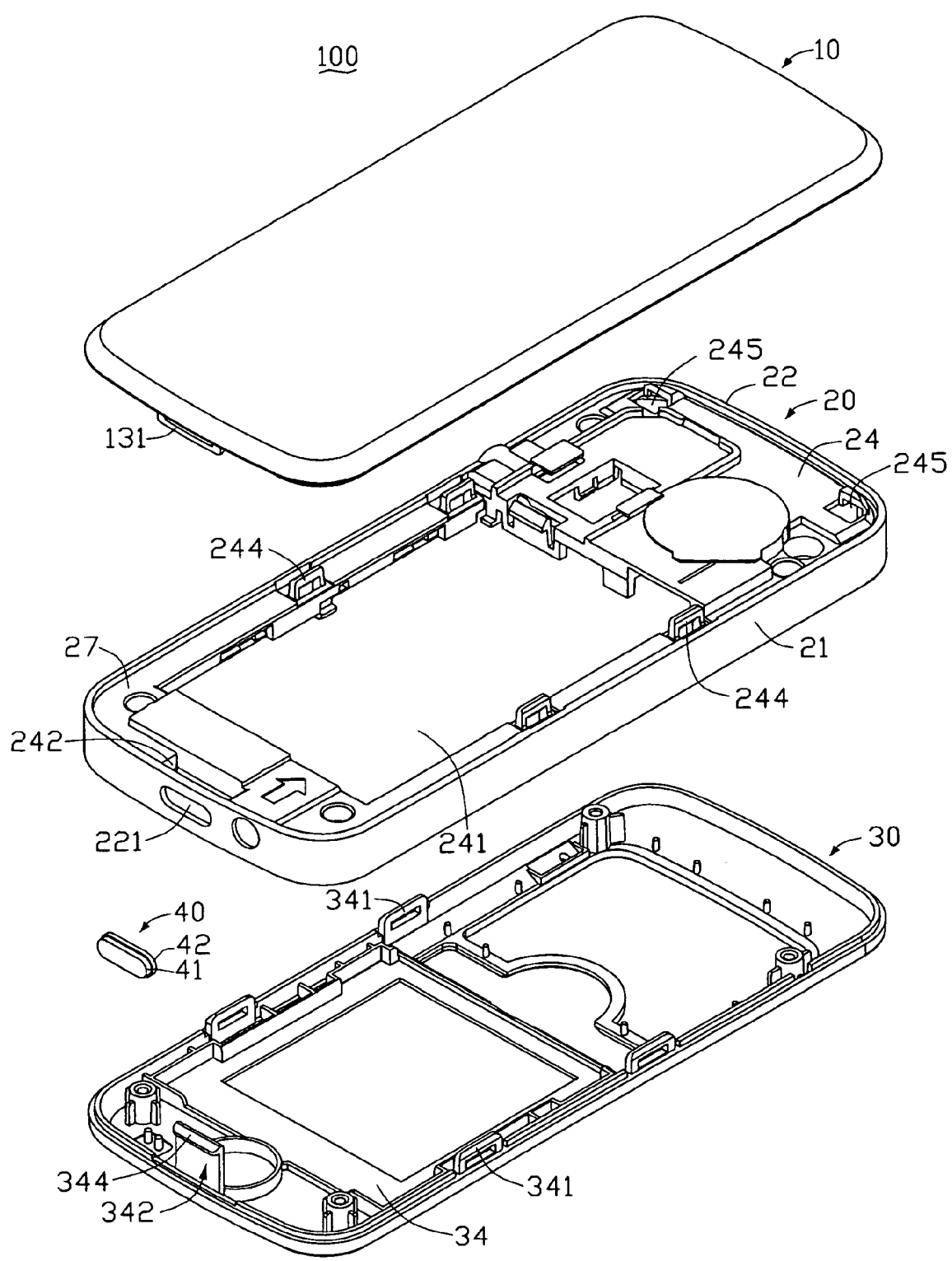
FIG. 2 is an exploded, isometric view of the mobile phone shown in FIG. 1.
Figure 3:
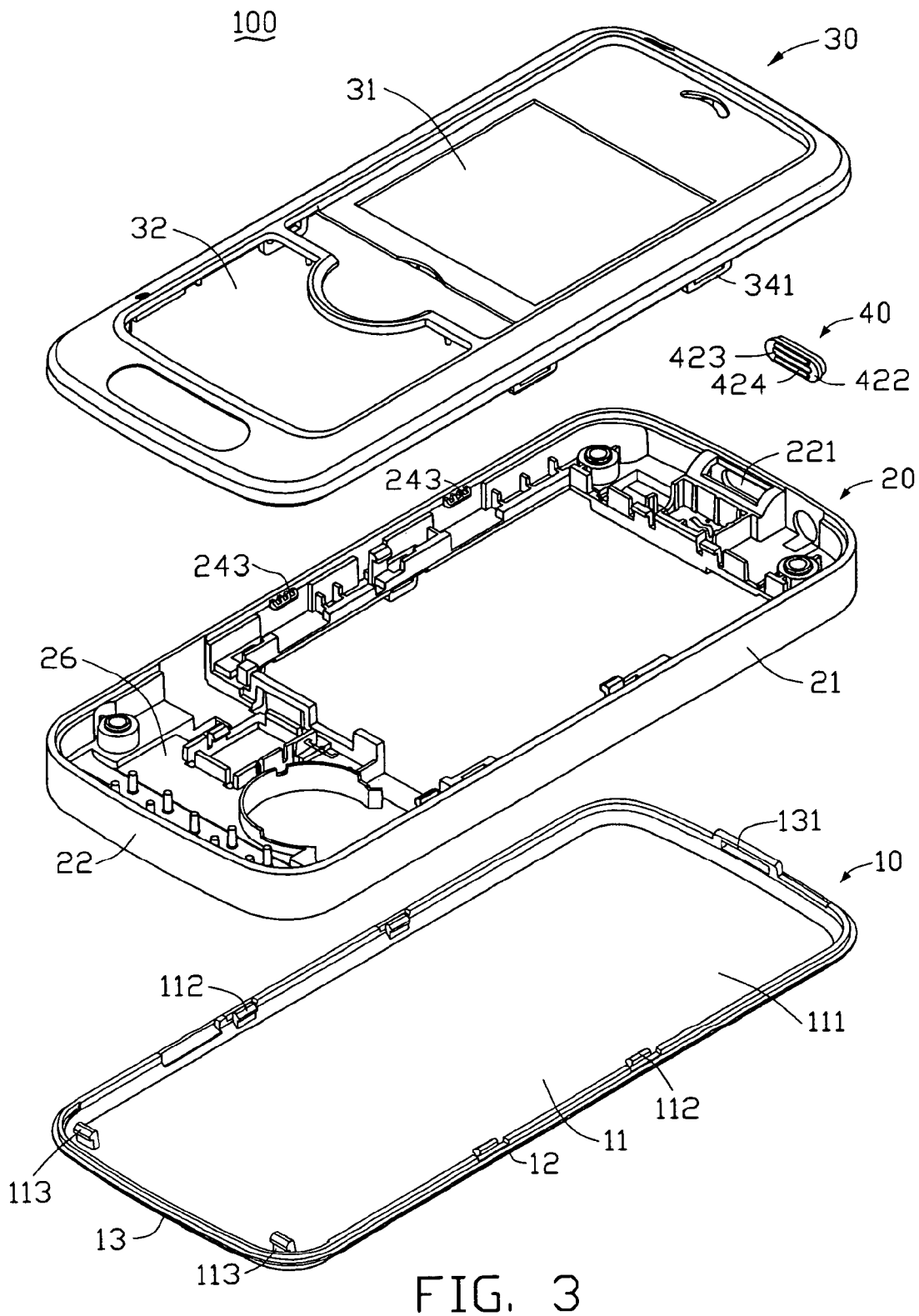
FIG. 3 is similar to FIG. 2, but viewed from another aspect.

Referring to FIG. 2 and FIG. 3, the battery cover 10 includes a main body 11, two opposite long sides 12 and two opposite short sides 13. The main body 11 is a substantially rectangular sheet, which together with the long sides 12 and the short sides 13 defines a substantially rectangular space (not labeled) for engaging with the housing 20. The main body 11 has an inner surface 111. A pair of symmetrical first claws 112 is disposed on the inner surface 111 of the main body 11, and adjacent to each long side 12. One end of each first claw 112 is connected with the inner surface 111, and the other end of each first claw 112 is hooked. A pair of symmetrical second claws 113 is disposed on the inner surface 111 of the main body 11, and adjacent to one short side 13. One end of each second claw 113 is connected with the inner surface 111, and the other end of each second claw 113 is hooked. The locking portion 131 is defined in the other short side 13 of the battery cover 10, and the other short side 13 is separate from the second claws 113.

The housing 20 is a substantially rectangular space, which has two opposite sidewalls 21 and two opposite end walls 22. The housing 20 includes a main partition wall 24, and the partition wall 24 separates a first compartment 26 from an opposite second compartment 27. The first compartment 26 is advantageously configured for accommodating an electronic device (not shown), such as a printed circuit board, therein. This accommodation occurs when the housing 20 is assembled with other housings (for example, front cover 30) of the mobile phone 100. The second compartment 27 is used to engagingly receive the battery cover 10. A recess 241 is defined in a middle portion of the partition wall 24. The recess 241 is used to receive a battery (not shown). A through hole 242 is defined in the partition wall 24, and adjacent to one end wall 22 of the housing 20. A button hole 221 is defined in the end wall 22, and is in communication with the through hole 242. At the first compartment 26, a pair of symmetrical clasps 243 is disposed on an inner surface of each sidewall 21. At the opposite second compartment 27, two pairs of symmetrical claw portions 244 are respectively formed in the partition wall 24, and adjacent to the sidewalls 21. The claw portions 244 are each engaged with their corresponding first claws 112. A pair of symmetrical limiting portions 245 is formed in the partition wall 24, and adjacent to the other end wall 22 separate from the button hole 221. The limiting portions 245 are each engaged with their corresponding second claws 113 of the battery cover 10.

The front cover 30 is a substantially rectangular sheet, and includes two opposite long sides (not labeled) and two opposite short sides (not labeled). The front cover 30 includes a display containing portion 31 used to contain a display (not shown), and a keyboard containing portion 32 used to contain a keyboard (not shown). A pair of symmetrical clasp portions 341 is formed in an inner surface 34, and adjacent to each long side of the front cover 30. The clasp portions 341 are each engaged with their corresponding clasps 243. The latch 342 is disposed on the inner surface 34, and adjacent to one short side of the front cover 30. The latch 342 is made of elastic material. One end of the latch 342 is connected with the inner surface 34, and a hook 344 facing outside of the front cover 30 is formed at the other end of the latch 342. The hook 344 is releasably engaged with the locking portion 131 of the battery cover 10.

Figure 4:
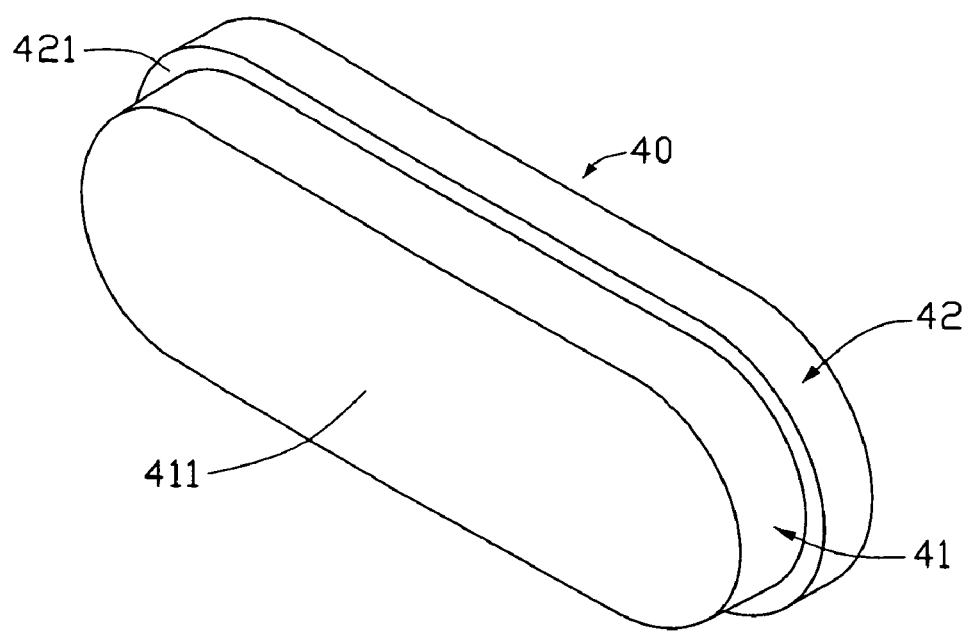
FIG. 4 is an enlarged, isometric view of a button of the battery cover latching assembly as shown in FIG. 1.
Figure 5:
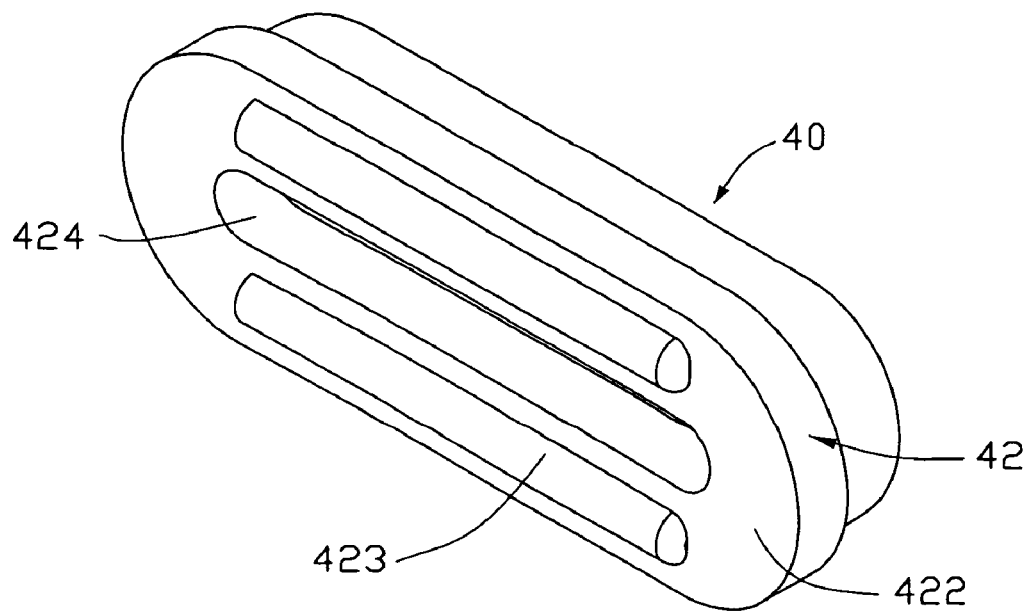
FIG. 5 is similar to FIG. 4, but viewed from another aspect.

Referring to FIG. 4 and FIG. 5, the button 40 includes an operation portion 41 and a resisting portion 42 protruding from the operation portion 41. The operation portion 41 has an operation surface 411 for pressing by a user. The resisting portion 42 has a step surface 421 and an opposite end surface 422. A pair of symmetrical resisting tabs 423 is disposed on the end surface 422 of the button 40. A groove 424 is defined in the end surface 422 between the resisting tabs 423. The shape of the button 40 corresponds to the button hole 221 of the housing 20. A sectional area of the operation portion 41 is slightly smaller than that of the button hole 221 of the housing 20, thus the operation portion 41 can be received in the button hole 221 of the housing 20. A sectional area of the resisting portion 42 is larger than that of the button hole 221 of the housing 20.

Figure 6:
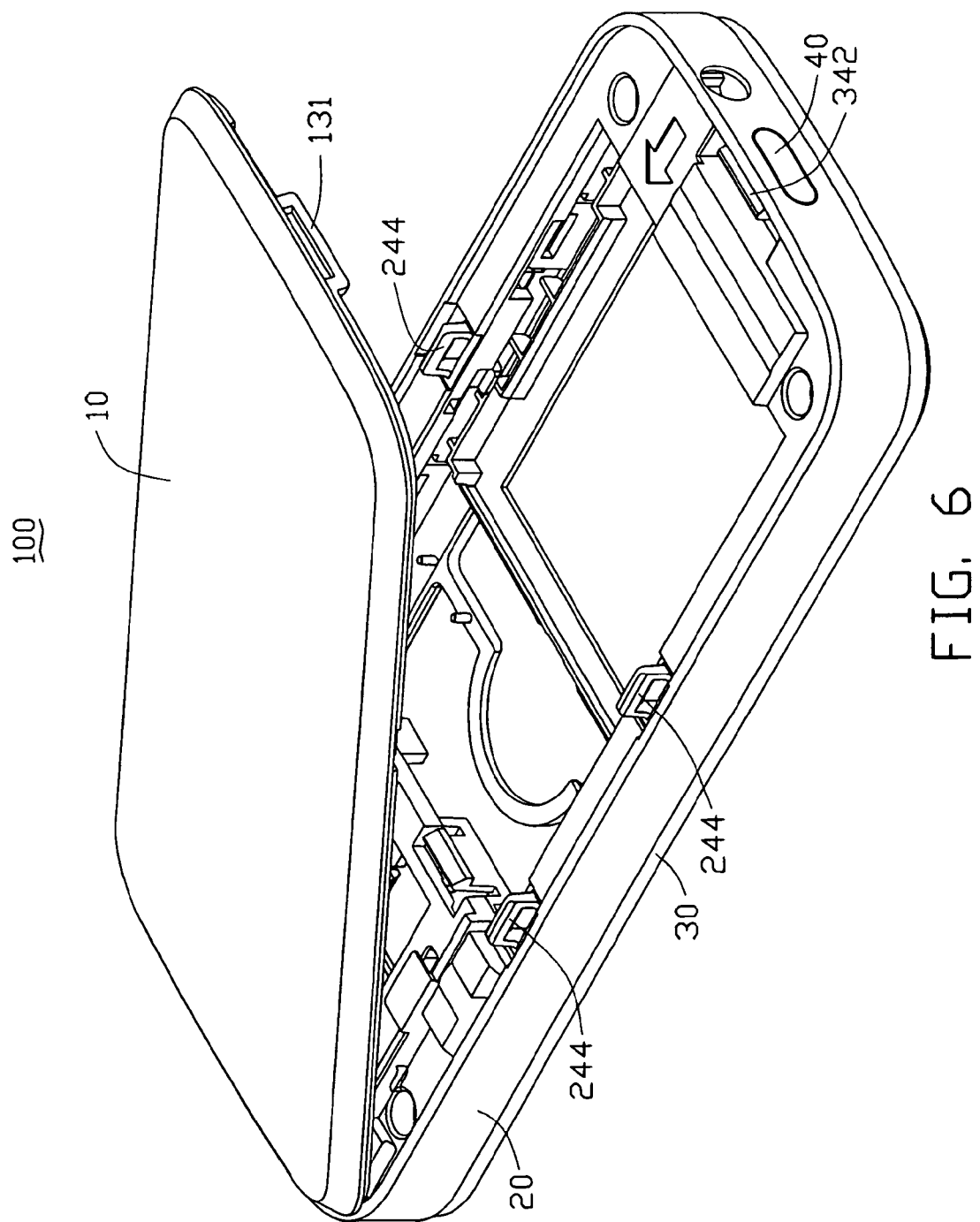
FIG. 6 is an isometric view of the mobile phone with a battery cover opened to a housing shown in FIG. 1.
Figure 7:
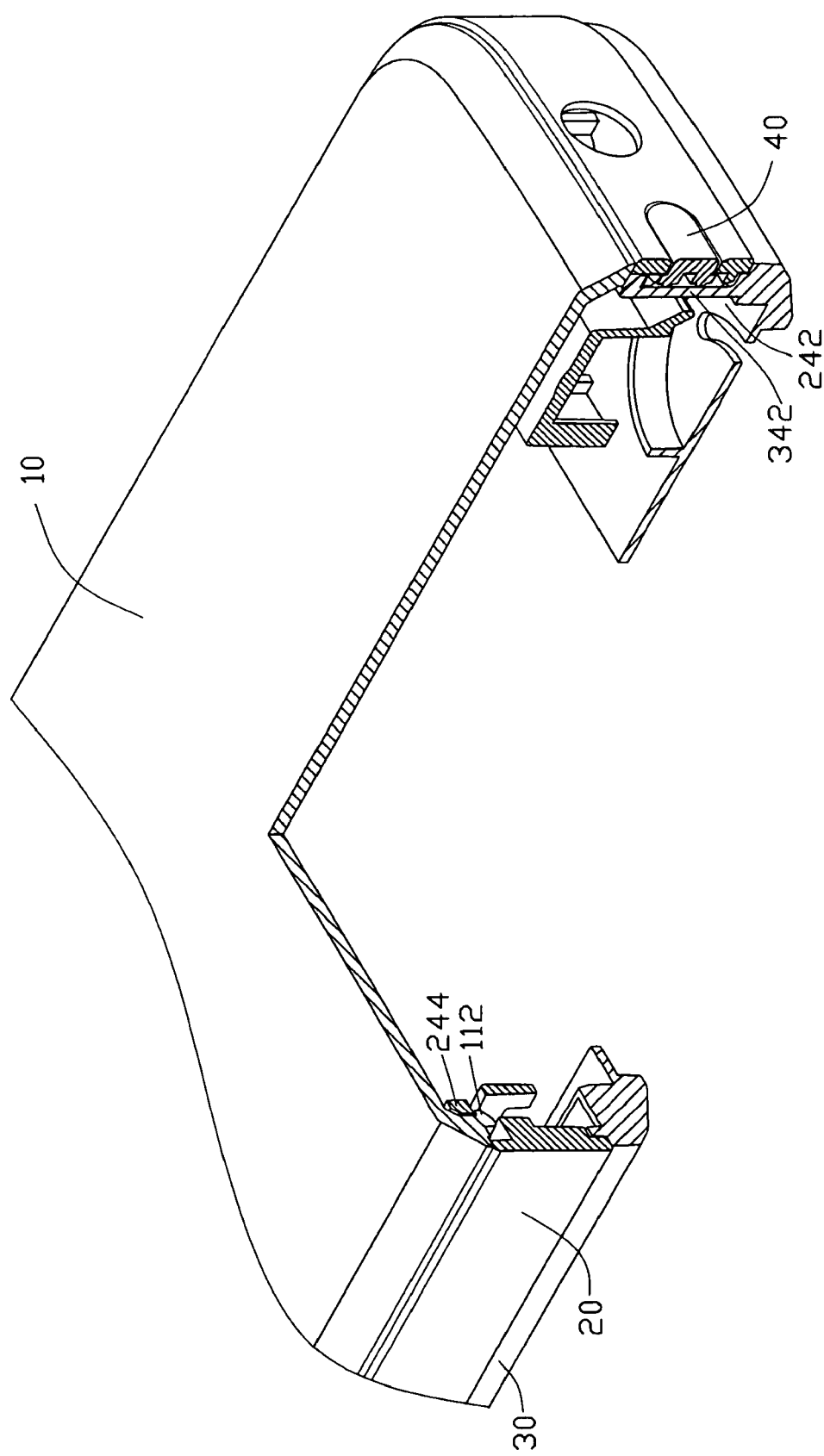
FIG. 7 is an enlarged, partial cross-sectional view of the battery cover latching assembly, within the mobile phone shown in FIG. 1.

Referring to FIG. 6 and FIG. 7, in assembly, first, the operation portion 41 of the button 40 is inserted through the through hole 242 of the housing 20, and is then received in the button hole 221. At this time, the operation surface 411 of the button 40 is flat along an outer surface of the end wall 22 approximately, and the step surface 421 of the button 40 abuts an opposite inner surface of the end wall 22 of the housing 20. Second, the front cover 30 is aimed at the housing 20, and the clasp portions 341 of the front cover 30 are each engaged with their corresponding clasps 243 of the housing 20. At the same time, the latch 342 of the front cover 30 extends through the through hole 242 of the housing 20 along a first axis, with the resisting tabs 424 of the button 40 abutting the latch 342 of the front cover 30, and the hook 344 of the latch 342 abutting an edge of the end wall 22 of the housing 20. Finally, the second claws 113 of the battery cover 10 are each engaged with their corresponding limiting portions 245 of the housing 20 (best seen in FIG. 6). The battery cover 10 is rotated toward the housing 20 via the limiting portions 245. The first claws 112 of the battery cover 10 are each engaged with their corresponding claw portions 244 of the housing 20, and the hook 344 of the latch 342 is received in the locking portion 131 of the battery cover 10. Thus, the battery cover 10 is assembled with the housing 20 and the front cover 30 via the battery cover latching assembly 50.

When the battery cover 10 is to be detached from the housing 20, the user presses the operation surface 411 of the button 40, and the resisting tabs 424 of the button 40 presses the latch 342 of the front cover 30, the button 40 is movable along a second axis perpendicular to the first axis. As a result, the hook 344 of the latch 342 is disengaged with the locking portion 131. Then, the battery cover 10 is rotated separate from the housing 20 via the limiting portions 245. The first claws 112 of the battery cover 10 are disengaged with the claw portions 244 of the housing 20, and the second claws 113 of the battery cover 10 are disengaged with the limiting portions 245 of the housing 20, thus, the battery cover 10 is detached from the housing 20.

In alternative embodiments, the front cover 30 could be attached to the housing 20 by another suitable method, for example, by screws or pins. Also, the hook 344 of the latch 342 of the front cover 30 could be omitted, and the latch 342 could be engaged with the locking portion 131 by increasing a friction force therebetween.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device comprising:
   a housing having a through hole and a button hole defined therein, the button hole communicating with the through hole, the housing further comprising a main partition wall, a plurality of claw portions being formed in the partition wall;
   a battery cover attached to a first side of the housing, the battery cover including a locking portion, a main body, two opposite long sides and two opposite short sides, the two long sides and the two short sides cooperatively surrounding the main body, the main body having an inner surface, a plurality of first claws being disposed on the inner surface of the main body, adjacent to each long side, one end of each first claw being connected with the inner surface of the battery cover, and the other end of each first claw being hooked, the claw portions being respectively engaged with their corresponding first claws;
   a front cover attached to an opposite second side of the housing, the front cover including a latch, the latch extending through the through hole along a first axis, and releasably engaging with the locking portion; and
   a button engaged in the button hole, the button being movable along a second axis perpendicular to the first axis to disengage the locking portion from the latch.

2. The portable electronic device as claimed in claim 1, wherein the main body has an inner surface, a plurality of second claws are disposed on the inner surface of the main body, adjacent to one short side, one end of each second claw is connected with the inner surface of the battery cover, and the other end of each second claw is hooked, the housing comprises a main partition wall, a plurality of limiting portions are formed in the partition wall, and the limiting portions are respectively engaged with their corresponding second claws.

3. The portable electronic device as claimed in claim 2, wherein the locking portion is formed at the other short side.

4. The portable electronic device as claimed in claim 2, wherein the through hole is defined in the partition wall, adjacent to the other end wall of the housing, and the button hole is defined in the housing in the end wall separate from the limiting portions.

5. The portable electronic device as claimed in claim 1, wherein a plurality of clasps are disposed on the housing, a plurality of clasp portions are formed in an inner surface of the front cover, and each clasp portion engages with its corresponding clasp of the housing.

6. The portable electronic device as claimed in claim 5, wherein the latch is disposed on the inner surface of the front cover, and the latch is made of elastic material.

7. The portable electronic device as claimed in claim 6, wherein the latch comprises a hook, the hook is releasably engaged with the locking portion of the battery cover.

8. The portable electronic device as claimed in claim 1, wherein the button comprises an operation portion and a resisting portion protruding from the operation portion.

9. The portable electronic device as claimed in claim 8, wherein the resisting portion comprises a step surface and an opposite end surface, and a resisting tab is disposed on the end surface of the button.

10. The portable electronic device as claimed in claim 9, wherein the shape of the button corresponds to the button hole of the housing.

11. The portable electronic device as claimed in claim 10, wherein a sectional area of the operation portion is smaller than that of the button hole of the housing, and a sectional area of the resisting portion is larger than that of the button hole of the housing.

12. A cover latching assembly for a portable electronic device including a housing, the housing comprising a main partition wall, a plurality of claw portions being formed in the partition wall, a first cover configured for attaching to a first side of the housing, and a second cover configured for attaching to a second side of the housing, the first cover comprising a main body, two opposite long sides and two opposite short sides, the two long sides and the two short sides cooperatively surrounding the main body, the main body having an inner surface, the cover latching assembly comprising:

a plurality of first claws disposed on the inner surface of the main body, adjacent to each long side, one end of each first claw being connected with the inner surface of the battery cover, and the other end of each first claw being hooked, the claw portions being respectively engaged with their corresponding first claws;

a locking portion formed on the first cover;

a latch formed on the second cover, the latch being engageable with the locking portion so as to lock the first cover and second cover with each other; and a button configured so as to be retained by the housing, the button being operable to deform the latch so as to unlock the first cover and the second cover.

13. The cover latching assembly as claimed in claim 12, wherein the housing defines a through hole for allowing the latch to extend through.

\* \* \* \* \*

UNITED STATES PATENT AND TRADEMARK OFFICE
CERTIFICATE OF CORRECTION

PATENT NO. : 7,660,560 B2  Page 1 of 1
APPLICATION NO. : 11/377790
DATED : February 9, 2010
INVENTOR(S) : Zuo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 995 days.

Signed and Sealed this

Thirtieth Day of November, 2010

David J. Kappos
*Director of the United States Patent and Trademark Office*